(12) United States Patent
McVeigh (10) Patent No.: US 6,175,654 B1
(45) Date of Patent: *Jan. 16, 2001

(54) METHOD AND APPARATUS FOR ENCODING DATA IN AN INTERFRAME VIDEO ENCODER

(75) Inventor: Jeffrey S. McVeigh, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/048,963

(22) Filed: Mar. 26, 1998

(51) Int. Cl.[7] ........................................................ G06K 9/36
(52) U.S. Cl. .................................... 382/236; 382/238
(58) Field of Search ..................................... 382/236, 238, 382/253; 348/699; 704/219

(56) References Cited

U.S. PATENT DOCUMENTS

| 5,778,334 | * | 7/1998 | Ozawa et al. | 704/219 |
| 5,781,249 | * | 7/1998 | Hwang | 348/699 |
| 5,825,929 | * | 10/1998 | Chen et al. | 382/236 |
| 5,909,513 | * | 6/1999 | Liang et al. | 382/253 |

* cited by examiner

Primary Examiner—Jose L. Couso
Assistant Examiner—Anh Hong Do
(74) Attorney, Agent, or Firm—Blakely, Sokoloff, Taylor & Zafman LLP (57) ABSTRACT

A method for encoding video data includes ordering regions of a frame to be encoded according to prediction distortion values. The regions of the frame are encoded according to the ordering.

22 Claims, 7 Drawing Sheets

METHOD AND APPARATUS FOR ENCODING DATA IN AN INTERFRAME VIDEO ENCODER

FIELD OF THE INVENTION

The present invention relates to the field of digital image processing. More specifically, the present invention relates to a method and apparatus for encoding data in an interframe video encoder.

BACKGROUND OF THE INVENTION

Interframe video encoding systems in the past predicted a current frame from a previously reconstructed frame and performed quantization on the residual between the previous frame and the predicted frames on a region-by-region basis. For example, in the Moving Pictures Experts Group 2 (MPEG-2) Video Compression Standard, published 1994, macroblocks of 16×16 pixels are predicted and the residual of the macroblocks are encoded. Due to the structure of the encoded bitstream syntax, the regions are encoded in a sequential fashion starting at the top-left corner of the frame and proceeding in rows across, and then down the frame. If a particular data rate is required for the transmission of the encoded bitstream within a bandlimited channel, data rate control is employed to encode each frame to a specific bit allocation. Accurate control of the encoded frame size is required for low-delay environments because an overshoot in the encoded frame size is buffered, incurring delay.

Prior methods used for frame-accurate data rate control dynamically increased or decreased the degree of lossy encoding for each region of the residual frame to achieve the desired bit allocation. A higher degree of lossy encoding generally resulted in fewer encoded bits. The decision to alter the degree of lossy encoding is performed using feedback of the number of bits spent to encode the first portion of the frame and statistical information on the regions that still need to be encoded.

Figure 1:
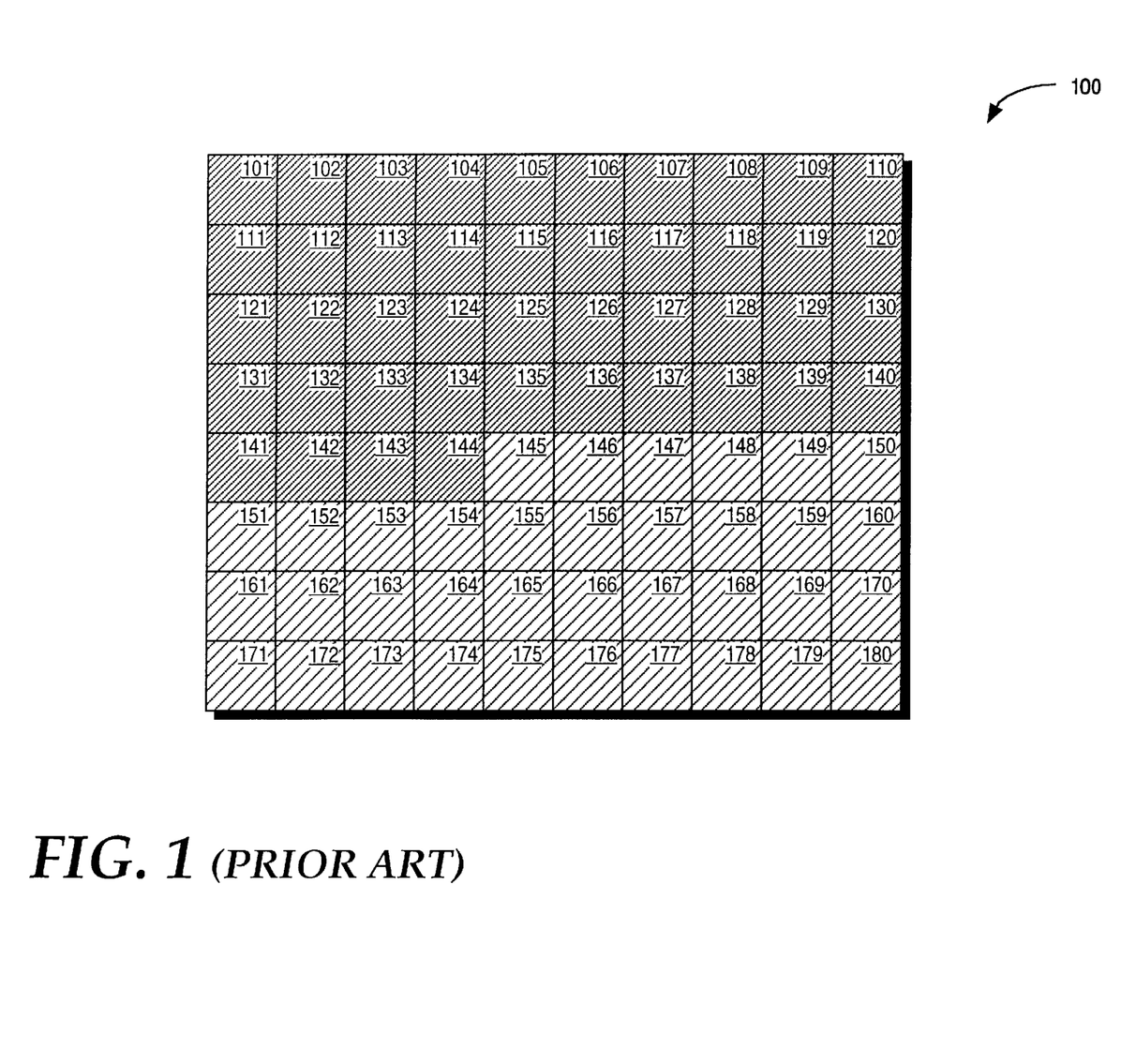
FIG. 1 illustrates a bit map of an image encoded using a prior art method of dynamic quantization.

A problem with these methods is that a frame may be generated with regions of vastly different reconstructed quality where the quality of the region may depend on the sequential order of the region within the frame. For example, FIG. 1 illustrates a bit map 100 of an image encoded using this prior art method of dynamic quantization. The bit map 100 includes a plurality of macroblocks 101–180. It should be appreciated that any number of macroblocks may be used to compose the bit map 100 and that 80 macroblocks are shown for illustrative purposes only. Due to the structure of the encoded bitstream syntax, the macroblocks are encoded in a sequential fashion starting at the top-left corner of the frame with macroblock 101 and proceeding left to right across each row, and then down the frame, ending with macroblock 180. If for example, the need to increase the degree of lossy encoding to meet a data rate requirement is realized during the encoding of macroblock 144, the macroblocks located at the upper regions of the frame, macroblocks 101–144, may have higher reconstructed quality than macroblocks located at the bottom regions of the frame, macroblocks 145–180. The discrepancy in the quality of the image in regions represented by macroblocks 101–144 and macroblocks 145–180 may be noticeable and undesirable. Another problem with these methods is that additional bits are required to describe the change in degree of lossy encoding for each region in the frame.

SUMMARY

A method for encoding data in an interframe video encoder is disclosed. Regions of a frame to be encoded are ordered according to prediction distortion values. The regions of the frame are encoded according to the ordering.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 2:
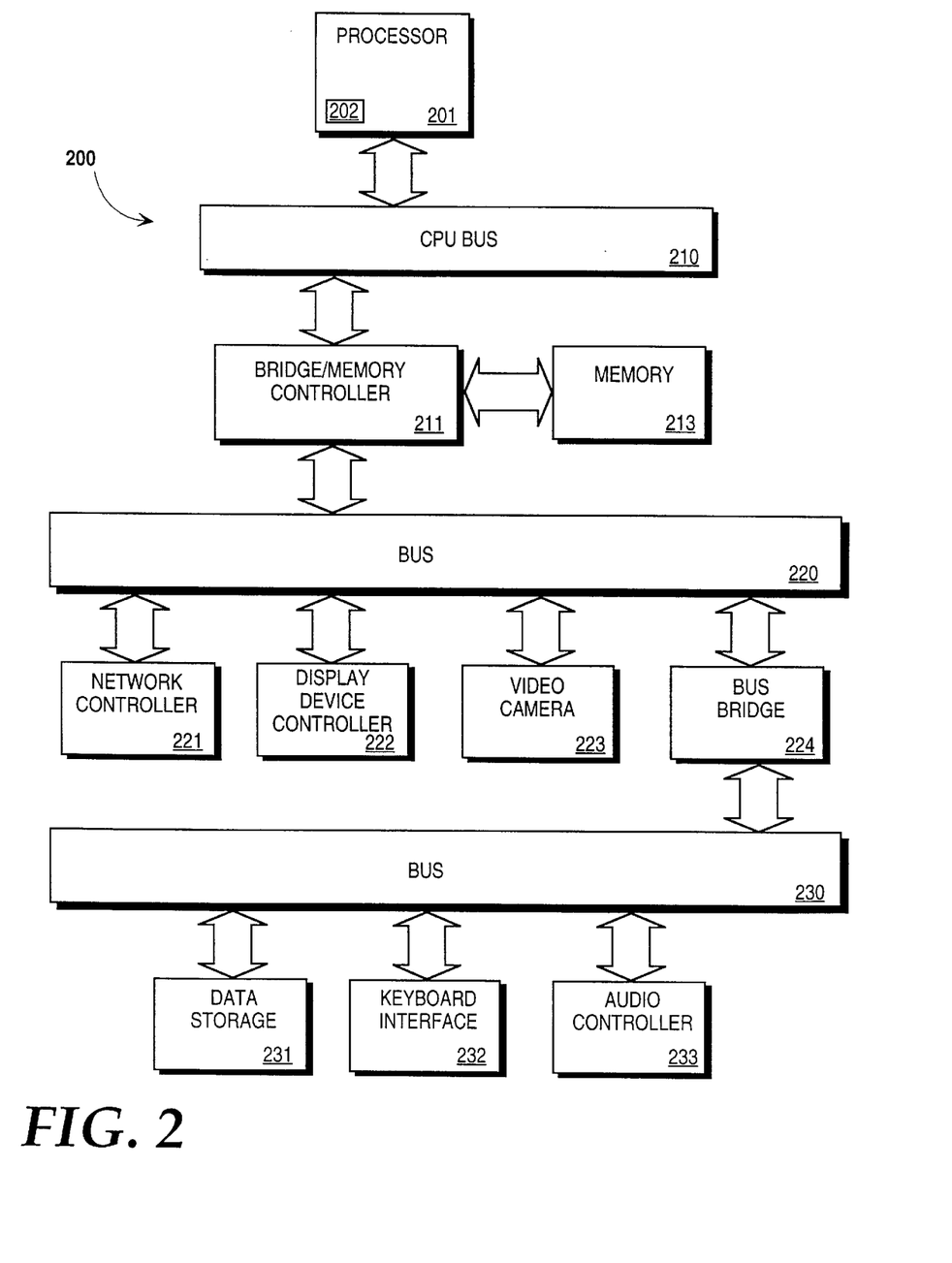
FIG. 2 illustrates a block diagram of a computer system implementing an embodiment of the present invention.

Referring to FIG. 2, a computer system upon which an embodiment of the present invention can be implemented is shown as 200. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 is coupled to the first I/O bus 220. The video camera 220 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds is also coupled to the I/O bus 230.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to encode video data. According to one embodiment, encoding video data is performed by the computer system 200 in response to the processor 201 executing sequences of instructions in main memory 213. Such instructions may be read into memory 213 from another computer-readable medium, such as data storage device 231, or from another source via the network controller 221. Execution of the sequences of instructions causes the processor 201 to encode video data, as will be described hereafter. In an alternative embodiment, hardwired circuitry may be used in place of or in combination with software instructions to implement the present invention. Thus, the present invention is not limited to any specific combination of hardware circuitry and software.

Figure 3:
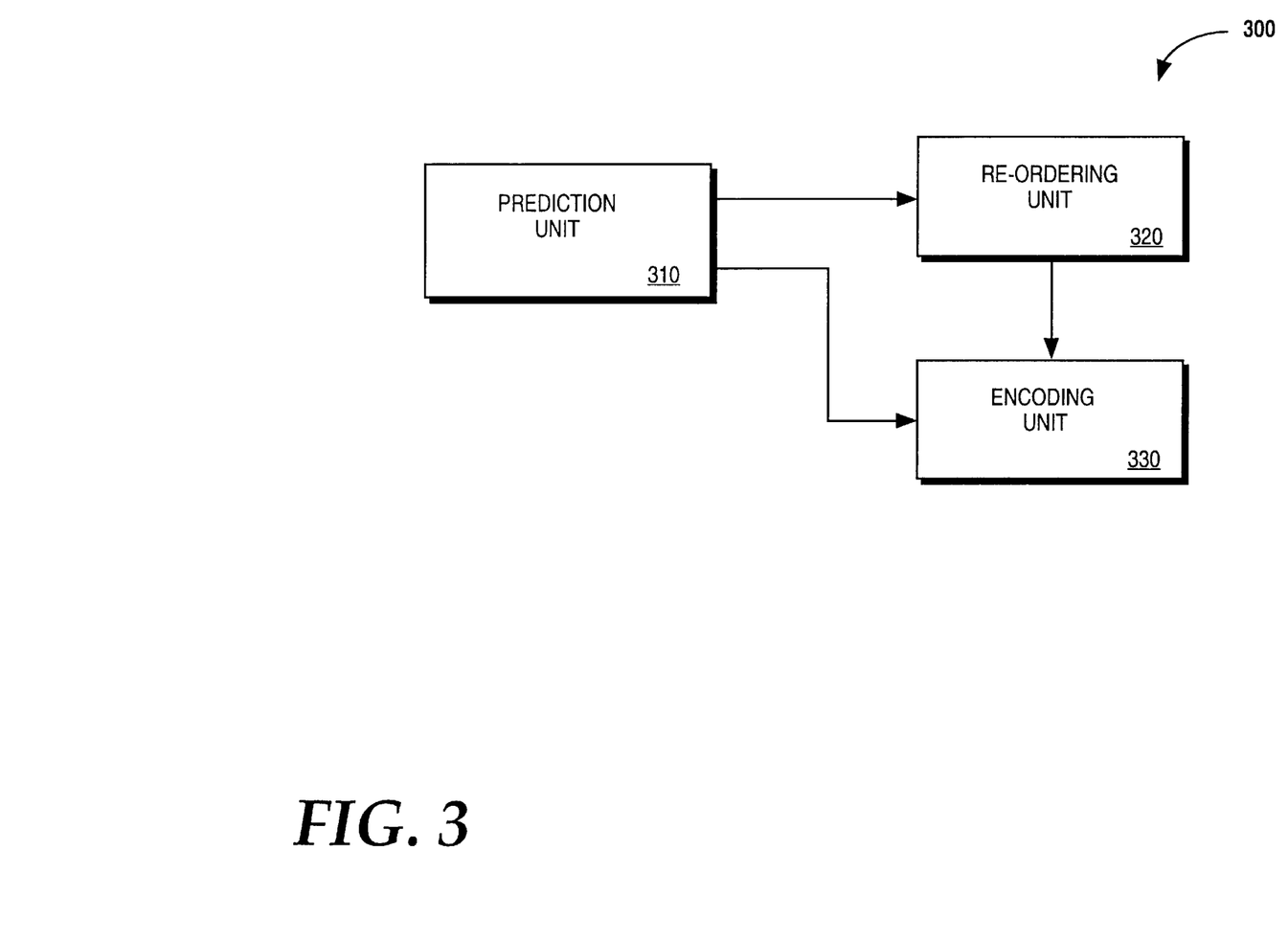
FIG. 3 is a block diagram illustrating modules implementing an interframe video encoder according to an embodiment of the present invention.

FIG. 3 is a block diagram illustrating modules implementing an interframe video encoder 300 according to an embodiment of the present invention. In a preferred embodiment of the present invention, the modules are implemented by software and reside in main memory 213 (shown in FIG. 2) as sequences of instructions. It should be appreciated that the modules may also be implemented by hardware as components coupled to the bus 220 (shown in FIG. 2) or a combination of both hardware and software. Block 310 represents a prediction unit 310. The prediction unit 310 receives video data that includes a frame to be encoded. The video data may be retrieved from the video camera 223 or from other sources. The frame to be encoded may be transmitted to another computer system via the network controller 221 (shown in FIG. 2) or stored on the data storage unit 231 (shown in FIG. 2) to be viewed at a later time for example. The frame to be encoded includes a plurality of pixels that may be grouped into macroblocks. According to an embodiment of the present invention, macroblocks are groups of 16×16 pixels.

The prediction unit 310 compares regions of the frame to be encoded with displaced regions in a previously encoded frame. The prediction unit 310 generates residual data that describe how to modify a displaced region in the frame previously encoded to generate the region in the frame to be encoded. The prediction unit 310 also generates a prediction distortion value that indicates the quality of the prediction. For example, if a region in the frame to be encoded is similar to its displaced region in the previously encoded frame, the prediction quality would be good. The prediction distortion value for this region would be low since the residual data would not include extensive modification instructions. However, if the region in the frame to be encoded is different than its displaced region in the previously encoded frame, the prediction quality would be bad. The prediction distortion value for this region would be high since the residual data would require extensive modification instructions to describe the differences between the frame to be encoded and its prediction.

Block 320 represents a re-ordering unit. The re-ordering unit 320 receives the prediction distortion values corresponding to the regions of the frame to be encoded and orders the regions according to their prediction distortion value. According to an embodiment of the present invention, the re-ordering unit 320 orders the regions in the frames to be encoded from worst prediction quality to best prediction quality so that the regions in the frame to be encoded are ordered from highest to lowest prediction distortion value.

Block 330 represents an encoding unit 330. The encoding unit 330 receives the ordered regions in the frames to be encoded from the re-ordering unit 320 and the residual data from the prediction unit 310. The encoding unit 330 operates to encode the regions in the frame to be encoded with the residual data according to the order received from the re-ordering unit 320. Thus, the encoding unit 330 encodes the region requiring the most modifications first. By first encoding the regions in a frame with the lowest prediction quality, the encoding unit 330 insures that the regions that have the poorest visual quality are encoded with the sufficient number of bits.

According to an embodiment of the present invention, the encoding unit 330 also estimates a degree of quantization to perform on the frame to be encoded based on the prediction quality of the regions of the frame to be encoded, statistics from previously encoded frames, and the present data rate requirement. This allows the regions in the frame to be encoded to have approximately the same reconstructed quality. By assigning a single degree of quantization to perform on a frame, the need for overhead bits to describe the change in degree of quantization as used in methods of dynamic quantization is no longer required.

According to an embodiment of the present invention, a region is defined by a macroblock of 16×16 pixels. It should be appreciated, however, that a region may be defined by an area larger or smaller than 16×16 pixels. The prediction unit 310, the reordering unit 320, and the encoding unit 330 may be implemented by any known technique or circuitry. According to an embodiment of the interframe video encoder 300 where the prediction unit 310, the re-ordering unit 320, and the encoding unit 330 are implemented in hardware, the prediction unit 310, the re-ordering unit 320, and the encoding unit 330 all reside on the same silicon substrate.

Figure 4:
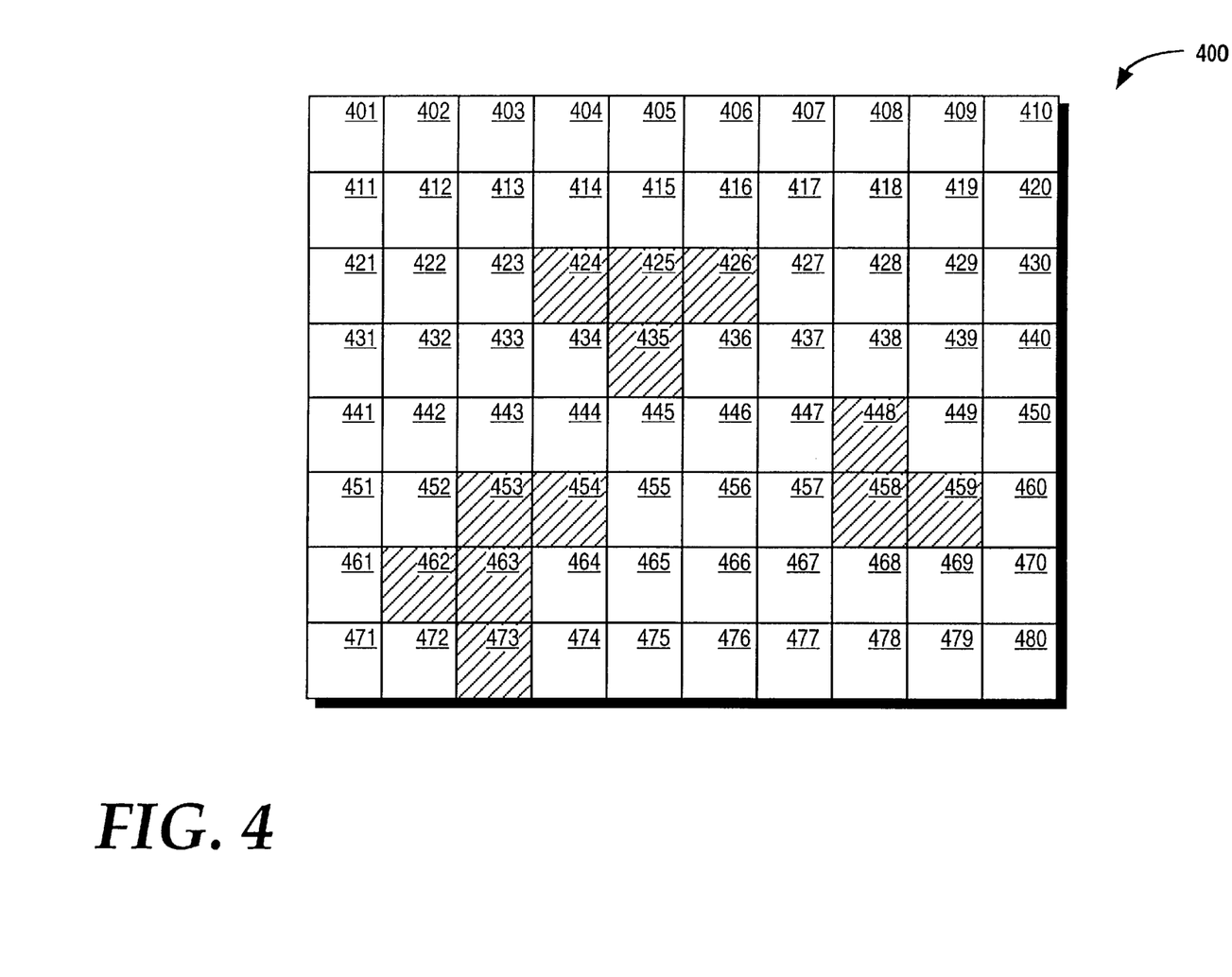
FIG. 4 is a bit map of an image partially encoded according to the present invention.

FIG. 4 illustrates a bit map 400 of an image partially encoded according to an embodiment of the present invention. The bit map 400 includes a plurality of macroblocks 401–480. It should be appreciated that any number of macroblocks may be used to compose the bit map 400 and that 80 macroblocks are shown for illustrative purposes only. According to an example where the re-ordering unit 320 (shown in FIG. 3) orders macroblocks 462, 463, 473, 453, and 454 as regions in the frame to be encoded with the worst predictive quality, encoding unit 330 (shown in FIG. 3) encodes macroblocks 462, 463, 473, 453, and 454 before encoding the other macroblocks in the frame 400. If the re-ordering unit 320 orders macroblocks 424, 425, 426, and 435 as regions with the next worst predictive quality, encoding unit 330 would encode macroblocks 424, 425, 426, and 435 in that order before encoding the remaining macroblocks in the frame 400.

By first encoding the regions indicated by the re-ordering unit 320 that require the most bits to describe prediction artifacts, the regions possessing the most critical changes from the previously encoded frame are allocated bandwidth for encoding data before regions experiencing less changes. Thus, if the bandwidth for the residual data runs out, the regions in the frame requiring the most bits would have been addressed first in the residual data.

According to an alternate embodiment of the present invention, the degree of quantization is allowed to change from region to region in a frame to be encoded. If the need to increase the degree of lossy encoding to meet a data rate requirement is realized during the middle of encoding a frame, the regions in the frame requiring the most bits would have been addressed first in the encoding process. The discrepancies in the quality of image between the regions earlier encoded and the regions with an increased degree of lossy encoding would be minimal.

Figure 5:
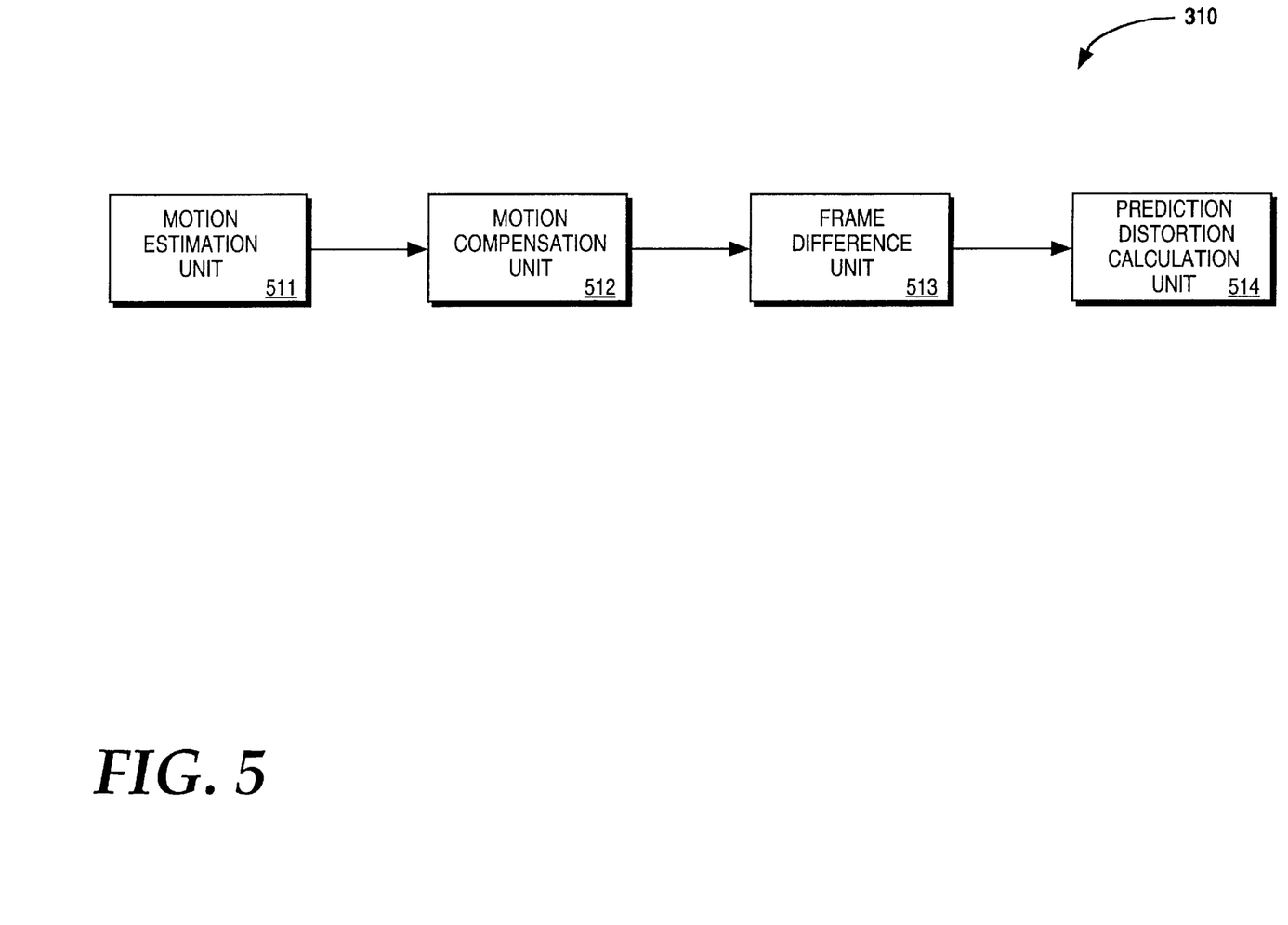
FIG. 5 is a block diagram of a prediction unit according to an embodiment of the present invention.

FIG. 5 is a block diagram illustrating a prediction unit 210 according to an embodiment of the present invention. The prediction unit 210 includes a motion estimation unit 511. The motion estimation unit 511 receives video data that includes a frame to be encoded and a frame previously encoded. The motion estimation unit 511 analyzes regions of the frames to be encoded and regions of the frame previously encoded and generates motion vectors that define how images in the frame previously encoded are to be displaced in order to generate the regions of the frame to be encoded.

A motion compensation unit 512 is coupled to the motion estimation unit 511. The motion compensation unit 512 receives the motion vectors for the regions of the frame to be encoded from the motion estimation unit 511. From the motion vectors, the motion compensation unit 512 generates a prediction using the previously encoded frame for each of the regions of the frame to be encoded.

A frame difference unit 513 is coupled to the motion compensation unit 512. The frame difference unit 513 receives the prediction for each of the regions of the frame to be encoded from the motion compensation unit 512. The frame difference unit 513 generates residual data that describes the difference between the prediction for each of the regions of the frame to be encoded and the frame to be encoded.

A prediction distortion calculation unit 514 is coupled to the frame difference unit 513. The prediction distortion calculation unit 514 receives the residual data from the frame difference unit 513 and calculates a prediction distortion value from the residual data. The prediction distortion value represents the performance of the prediction. If a frame to be encoded requires extensive modifications from a frame previously encoded, the prediction distortion is likely to be large. On the other hand, if a frame to be encoded requires little modification from a frame previously encoded, the prediction distortion is likely to be small. According to a first embodiment of the prediction distortion calculation unit 514, the prediction distortion value is calculated by taking the mean squared error of the residual data. According to a second embodiment of the residual calculation unit 514, the prediction distortion value is calculated by taking the sum of absolute difference of the residual data. It should be appreciated that other known methods for generating a value indicating the quality of the prediction may be used. Typically, a large prediction distortion value corresponds to residual data large in size where the prediction quality is poor. A small prediction distortion value corresponds to residual data small in size where the prediction quality is good.

The motion estimation unit 511, motion compensation unit 512, frame difference unit 513, and prediction distortion calculation unit 514 may be implemented by any known technique or known circuitry.

Figure 6:
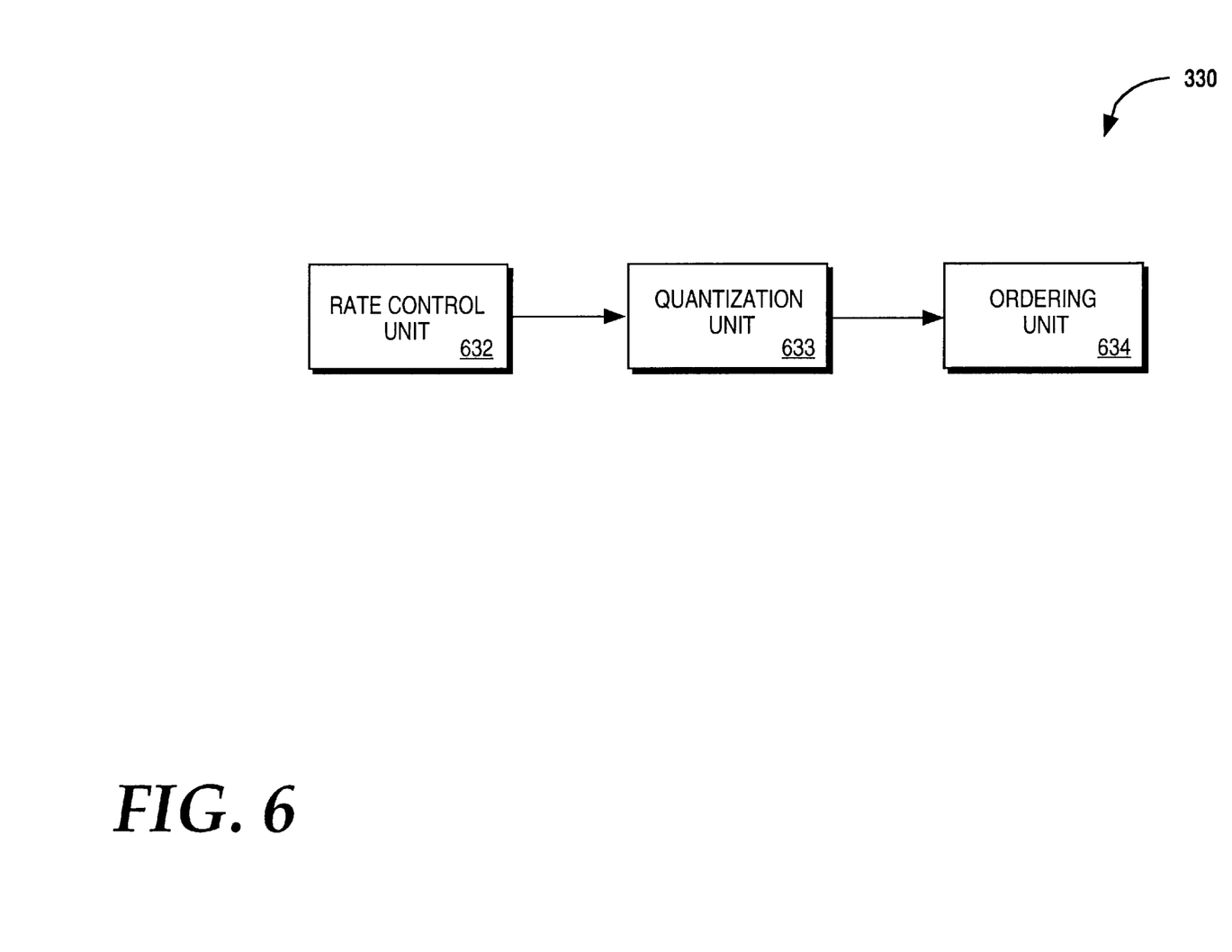
FIG. 6 is a block diagram of an encoding unit according to an embodiment of the present invention.

FIG. 6 illustrates an encoding unit 330 according to an embodiment of the present invention. The encoding unit 330 includes a rate control unit 632. The rate control unit 632 receives the prediction distortion value of the regions of the frame to be encoded. The rate control unit 632 generates a degree of quantization to perform on the frame to be encoded based on the prediction distortion values of the frame to be encoded, statistics of previously encoded frames, which may include degrees of quantization generated for the previously encoded frames, and the present data rate requirement.

A quantization unit 633 is coupled to the rate control unit 632. The quantization unit 633 receives the residual data received from the frame difference unit 513 (shown in FIG. 5) and the degree of quantization generated by the rate control unit 632. The quantization unit 633 quantizes the residual data according to the degree of quantization generated by the rate control unit 632. According to an embodiment of the present invention, the quantization unit 633 performs lossy encoding on the residual data.

An ordering unit 634 is coupled to the quantization unit 633. The ordering unit 634 receives the quantized residual data from the quantization unit 633 and orders the quantized residual data according to a standard format. According to one embodiment of the ordering unit 634, the quantized residual data is ordered such that its corresponding region is presented from left to right, top to bottom. The rate control unit 632, the quantization unit 633, and the ordering unit 634 may be implemented by any known technique or circuitry.

Figure 7:
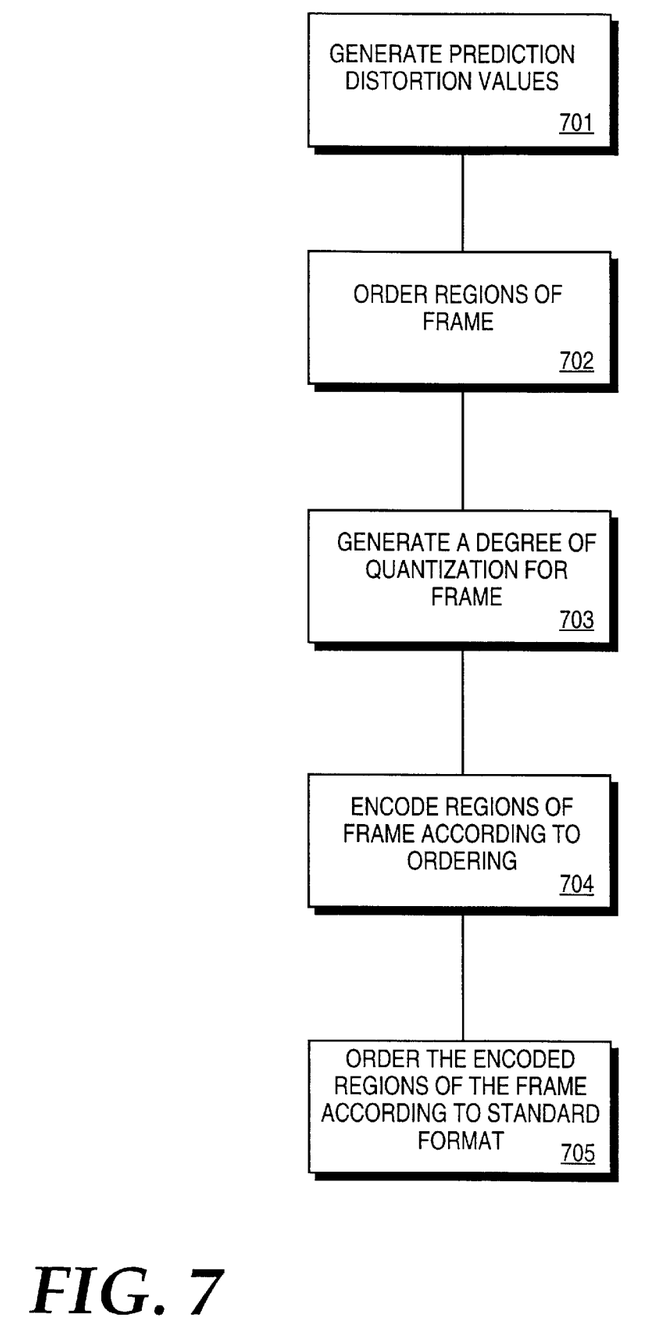
FIG. 7 is a flow chart illustrating a method for encoding video data according to an embodiment of the present invention.

FIG. 7 is a flow chart illustrating a method for encoding video data according to an embodiment of the present invention. At step 701, a prediction distortion value is generated for each region of a frame to be encoded. According to a first embodiment of the present invention, the prediction distortion value is generated by calculating a mean squared error of residual data corresponding to a region. According to a second embodiment of the present invention, the prediction distortion value is generated by calculating a sum of absolute difference of residual data corresponding to the region. The region may be defined as being any size area of the frame to be encoded.

At step 702, the regions of the frame to be encoded are ordered according to their prediction distortion value. According to an embodiment of the present invention, the regions are ordered from worst prediction quality (highest prediction distortion value) to best prediction quality (lowest prediction distortion value).

At step 703, a degree of quantization is generated for the frame to be encoded. According to an embodiment of the present invention, the degree of quantization is generated based on the prediction distortion value of the frame to be encoded, degrees of quantization generated for previously encoded frames, and the present data rate requirement.

At step 704, the regions of the frame are encoded according to the ordering. According to an embodiment of the present invention, the regions of the frame are encoded by quantizing the residual data according to the degree of quantization generated.

At step 705, the quantized residual data is ordered according to a standard format. According to an embodiment of the present invention, the quantized residual data is ordered such that their corresponding regions are presented from left to right, top to bottom.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A method for encoding data, comprising:
   obtaining prediction distortion values for regions of a frame to be encoded;
   ordering regions of the frame to be encoded according to the prediction distortion values wherein ordering the regions of the frame to be encoded comprises ranking the regions between a highest prediction distortion value and a lowest prediction distortion value; and
   encoding the regions of the frame according to the ordering.

2. The method of claim 1, wherein ordering the regions of the frame to be encoded according to the prediction distortion values comprises ranking the regions from a highest prediction distortion value to a lowest prediction distortion value.

3. The method of claim 1, further comprising the step of generating the prediction distortion values for each region of the frame.

4. The method of claim 3, wherein generating the prediction distortion values comprises calculating a mean-squared error of residual data between a first region of the frame to be encoded and a displaced first region of a frame previously encoded.

5. The method of claim 3, wherein generating the prediction distortion values comprises calculating a sum of absolute differences of residual data between a first region of the frame to be encoded and a displaced first region of a frame previously encoded.

6. The method of claim 1, further comprising the step of determining a single quantization value to encode the regions of the frame based on the prediction distortion values for the regions of the frame.

7. The method of claim 1, wherein encoding the regions of the frame comprises performing lossy quantization on the regions.

8. The method of claim 1, wherein each region is represented by a macroblock of 16×16 pixels.

9. A computer-readable medium having stored thereon sequences of instructions, the sequences of instructions including instructions which, when executed by a processor, causes the processor to perform the steps of:
   obtaining prediction distortion values for regions of a frame to be encoded;
   ordering regions of the frame to be encoded according to the prediction distortion values wherein ordering the regions of the frame to be encoded comprises ranking the regions between a highest prediction distortion value and a lowest prediction distortion value; and
   encoding the regions of the frame according to the ordering.

10. The computer-readable medium of claim 9, wherein ordering the regions of the frame to be encoded according to the prediction distortion values comprises ranking the regions from a highest prediction distortion value to a lowest prediction distortion value.

11. The computer-readable medium of claim 9, further comprising instructions which, when executed by the processor, causes the processor to perform the step of generating the prediction distortion values for each region of the frame.

12. The computer-readable medium of claim 11, wherein generating the prediction distortion values comprises calculating a mean-squared error of a residual between a first region of the frame to be encoded and a displaced first region of a frame previously encoded.

13. The computer-readable medium of claim 11, wherein generating the prediction distortion values comprises calculating a sum of absolute differences of a residual between a first region of the frame to be encoded and a displaced first region of a frame previously encoded.

14. The computer-readable medium of claim 9, further comprising instructions which, when executed by the processor, causes the processor to perform the step of determining a single quantization value to encode the regions of the frame based on the prediction distortion values for the regions of the frame.

15. The computer-readable medium of claim 9, wherein encoding the regions of the frame comprises performing lossy quantization on the regions.

16. The computer-readable medium of claim 9, wherein each region is represented by a macroblock of 16×16 pixels.

17. A video encoder, comprising:
   a prediction unit that calculates prediction distortion values for regions of a frame to be encoded;
   a re-order unit, coupled to the prediction unit, that generates an order for the regions of the frame to be encoded according to the prediction distortion values; and
   an encoding unit, coupled to the prediction unit, that encodes the regions of the frames to be encoded according to the order.

18. The interframe encoder of claim 17, wherein the prediction unit comprises a motion estimation unit that analyzes the regions of the frame to be encoded and regions of a frame previously encoded and that generates motion vectors that define how objects in the frame previously encoded are to be moved to generate the frame to be encoded.

19. The interframe encoder of claim 18, wherein the prediction unit further comprises:

a motion compensation unit, coupled to the motion estimation unit, that generates a prediction frame from the motion vectors; and a frame difference unit, coupled to the motion estimation unit, that generates residual data from the frame to be encoded and the predicted frame.

20. The interframe encoder of claim 19, wherein the prediction unit further comprises a prediction distortion calculation unit, coupled to the frame difference unit, that generates the prediction distortion values from the residual data.

21. The interframe encoder of claim 17, wherein the encoding unit comprises:

a rate control unit that generates a degree of lossy encoding to perform on the frame to be encoded based on prediction distortion values corresponding to regions in the frame to be encoded; and a quantization unit, coupled to the rate control unit, that performs lossy encoding on the residual data according to the degree generated by the rate control unit.

22. A computer system, comprising:

a bus;

a processor coupled to the bus; and a video encoder manager, coupled to the bus, that includes a prediction unit that calculates prediction distortion values for regions of a frame to be encoded, a re-order unit, coupled to the prediction unit, that generates an order for the regions of the frame to be encoded according to the prediction distortion values wherein the generated order of regions of the frame to be encoded comprises a ranking of the regions between a highest prediction distortion value and a lowest prediction distortion value, and an encoding unit, coupled to the prediction unit, that encodes the regions of the frames to be encoded according to the order.

\* \* \* \* \*

UNITED STATES PATENT AND TRADEMARK OFFICE
CERTIFICATE OF CORRECTION

PATENT NO. : 6,175,654 B1
DATED : January 16, 2001
INVENTOR(S) : McVeigh

It is certified that error appears in the above-identified patent and that said Letters Patent is hereby corrected as shown below:

Column 8,
Line 63, after the "values" and before ";" insert -- wherein the generated order of regions of the frame to be encoded comprises ranking of the regions between the highest prediction distortion value and a lowest prediction distortion value --.

Signed and Sealed this

Twenty-fifth Day of June, 2002

Attest:

JAMES E. ROGAN
Attesting Officer          Director of the United States Patent and Trademark Office